United States Patent [19]

Hiratsuka et al.

[11] Patent Number: 5,363,024

[45] Date of Patent: Nov. 8, 1994

[54] D.C. FAN CONTROL CIRCUIT DEVICE FOR LINEARLY VARIABLE COOLING

[75] Inventors: Yoshiaki Hiratsuka; Tsutomu Yoshii, both of Kawasaki, Japan

[73] Assignee: Fujitsu Limited, Kawasaki, Japan

[21] Appl. No.: 950,222

[22] Filed: Sep. 24, 1992

[30] Foreign Application Priority Data

Sep. 26, 1991 [JP] Japan .................. 3-274730

[51] Int. Cl.⁵ .................. H02P 6/02; G05D 23/24; H02H 7/085
[52] U.S. Cl. .................. 318/254; 318/434; 318/472; 388/903; 388/934
[58] Field of Search ............... 318/138, 254, 439, 434, 318/459, 471, 472, 478, 479; 361/23, 24, 25, 27; 310/66, 68 R; 388/903, 934

[56] References Cited

U.S. PATENT DOCUMENTS

| | | | |
|---|---|---|---|
| 4,376,261 | 3/1983 | von der Heide et al. | 318/254 |
| 4,554,491 | 11/1985 | Plunkett | 318/254 |
| 4,578,623 | 3/1986 | Tsukutani et al. | 318/254 |
| 4,656,553 | 4/1987 | Brown | 361/31 |
| 4,701,683 | 10/1987 | Kikkawa | 318/254 |
| 4,748,388 | 5/1988 | Müller | 318/254 |
| 4,755,728 | 7/1988 | Ban | 318/254 |
| 4,756,473 | 7/1988 | Takemae et al. | 361/384 X |
| 4,832,576 | 5/1989 | Deguchi et al. | 417/45 |
| 5,023,531 | 6/1991 | Altemose et al. | 318/471 |
| 5,099,181 | 3/1992 | Canon | 318/254 |

FOREIGN PATENT DOCUMENTS 0241105 10/1987 European Pat. Off. .
3914082 10/1990 Germany .

OTHER PUBLICATIONS

Paul R. Emeral, "A Merged Hall Effect/Power IC," Proceedings of the IEEE 1987 Custom Integrated Circuits Conference, Portland, Oreg., May 4–7, 1987, pp. 280–284.

Primary Examiner—Bentsu Ro
Attorney, Agent, or Firm—Staas & Halsey

[57] ABSTRACT

A control circuit for controlling a linearly variable speed cooling D.C. fan includes a stator including at least two pairs of main poles, two pairs of auxiliary poles and a Hall effect element provided at either of auxiliary poles. The control circuit also includes a rotor which as a casing, at least two pairs of N and S poles and a plurality of blades. Further, the control circuit includes a driving IC including an amplifier and two switching transistors, a temperature sensor detachable to a connector means, for determining a revolution speed of the D.C. fan that matches to the detected temperature, and a breakdown protection unit provided between said driving IC and said temperature sensor.

13 Claims, 9 Drawing Sheets

TIME BASE

D.C. FAN CONTROL CIRCUIT DEVICE FOR LINEARLY VARIABLE COOLING

BACKGROUND OF THE INVENTION

1. Field of the Invention

The present invention relates to a D.C. fan control circuit device for linearly variable cooling, and more particularly to a device for cooling a computer equipment or the like.

2. Description of the Related Arts

In recent years, it is required that a computer equipment should be operated in a low noise condition. For this reason, it is considered that a noise of a cooling fan as one of sound sources is reduced. As one of the noise reduction means, it is a recent trend that a temperature within the computer equipment or in an environment of the equipment is detected to make a revolutional speed of a fan change linearly and a low revolutional speed of the fan in low temperature keeps a noise in a low state to decrement an average noise.

When a computer equipment is cooled by the D.C. fan, if the D.C. fan is always driven at a constant speed, it is necessary to effect a high speed operation in conformity with a high temperature state of an environment around the computer equipment. Thereby, a high speed operation causes undesired high sound.

Therefore, two-speed type cooling system of the fan drive unit is adopted such that, when the environment is at a low temperature, the D.C. fan is driven at a low speed to cause a still state, whereas when the environment is at a high temperature, the D.C. fan is driven at a high speed to improve a cooling efficiency.

Nevertheless, according to the two-speed type cooling system, when the D.C. fan is driven near a switching-over temperature that converts a low speed drive to a high speed drive or vice versa, since a switching takes place frequently due to the up-down changes of temperature, the undesired sound of the D.C. fan varies frequently in proportion to the number of times of switching to cause a jar and become offensive to the ear.

As a result, it is desired that, when the temperature is more than a predetermined value, the D.C. fan is run fast at a definite rotational number, and when the temperature is less than a predetermined value, the rotational number is varied linearly to cause a noise at a lower level and make inoffensive to the ear.

When tried, it is found that the countermeasure does not work very well. To be more specific, multifarious disadvantages will be described as follows.

In the prior art linear speed control cooling system for the D.C. fan, if a driving voltage for the D.C. fan is accidentally applied to a lead to which a temperature sensor will be connected, it happens that a driving IC is damaged. Therefore, when a driving voltage is accidentally applied to the lead line, the driving IC is damaged and cannot make the D.C. fan rotate. Thereby, it will be disadvantageous that the computer unit is not cooled down to effect normal operation.

Since the computer equipment is designed with an originally forced air cooling system using a fan, when a rotation of the fan is stopped to be in a natural air-cooled state, the temperature of a specified part within the equipment rises extraordinarily. From this heating, it is disadvantageous that the computer equipment cannot be operated ordinarily or a system failure occurs.

Therefore, an object of the present invention is to provide a control circuit of the D.C. fan for linearly variable cooling that reduces or eliminates the above-described problems.

SUMMARY OF THE INVENTION

In accordance of the present invention, there is provided a control circuit for controlling a linearly variable speed cooling D.C. fan including: a stator including at least two pairs of main poles, two pairs of auxiliary poles and a Hall effect element provided at either of auxiliary poles; a rotor including a casing, at least two pairs of N and S poles and a plurality of blades; a driving IC including an amplifier and two switching transistors; a temperature sensor detachable to a connector means, for determining a revolutional speed of the D.C. fan that matches to the detected temperature; and a breakdown protection unit provided between the driving IC and the temperature sensor.

DESCRIPTION OF THE PREFERRED EMBODIMENTS

With reference to the figures a description will be made in comparison with the prior art.

Figure 1:
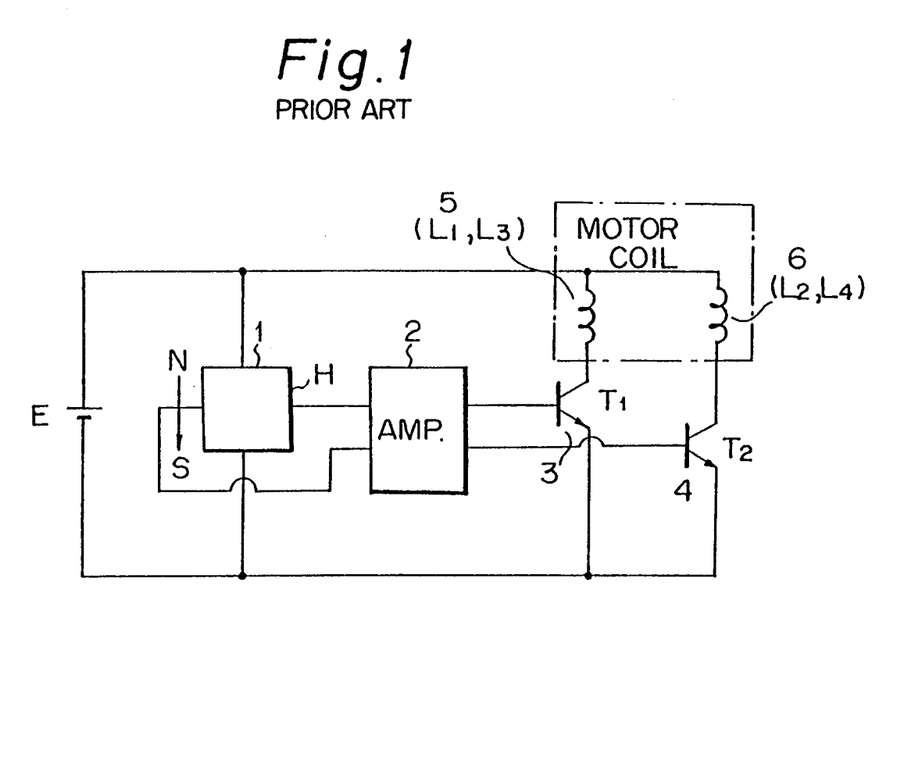
FIG. 1 is a schematic circuit diagram showing a D.C. fan control circuit in a prior art.

FIG. 1 is a schematic circuit diagram showing a D.C. fan control circuit in a prior art. For example, a Hall effect element 1 detects an N pole of a magnetic field produced by a magnet to produce an output. The output signal is amplified by an amplifier 2 and turns on a switching transistor T1 to flow current through a coil 5. A pair of opposed magnetic poles are magnetized to N poles by the current of the coil 5 and the other pair of opposed poles and auxiliary poles are magnetized to S poles. A pair of auxiliary poles magnetized to S poles attract N poles of a rotor and the other pair of auxiliary poles repel S poles of a rotor to produce a rotational torque.

When the rotor rotates by 90 degrees, the Hall effect element detects S poles of the magnet and makes another switching transistor turn ON to flow current through another motor coil 6. Then, another main pole are magnetized to N poles and the other main pole and auxiliary poles are magnetized to S poles. The latter auxiliary poles of S poles attract N poles of the rotor, the former repels S poles to rotate the rotor. Such process is repeated in sequence and the rotor is rotated continuously.

When a computer equipment is cooled by the D.C. fan, if the D.C. fan is always drived by a constant speed, it must be drived with high speed in conformity with a high temperature state of an environment around the computer equipment, thus causing undesired high sound. Accordingly, a two-speed type cooling system of the fan drive unit is adapted such that, when the environment is at a low temperature, the D.C. fan is drived at a low speed to cause a still state, whereas when the environment is at a high temperature, the D.C. fan is derived at a high speed to enhance a cooling efficiency.

Nevertheless, when the D.C. fan according to the two-speed type cooling system is drived in the vicinity of a switching-over temperature that converts a low speed drive to a high speed drive or vice versa, since a switching takes place frequently due to the rise and fall of the temperature, the undesired sound of the D.C. fan changes frequently accordingly to cause an offensive feeling to the ear.

Figure 2:
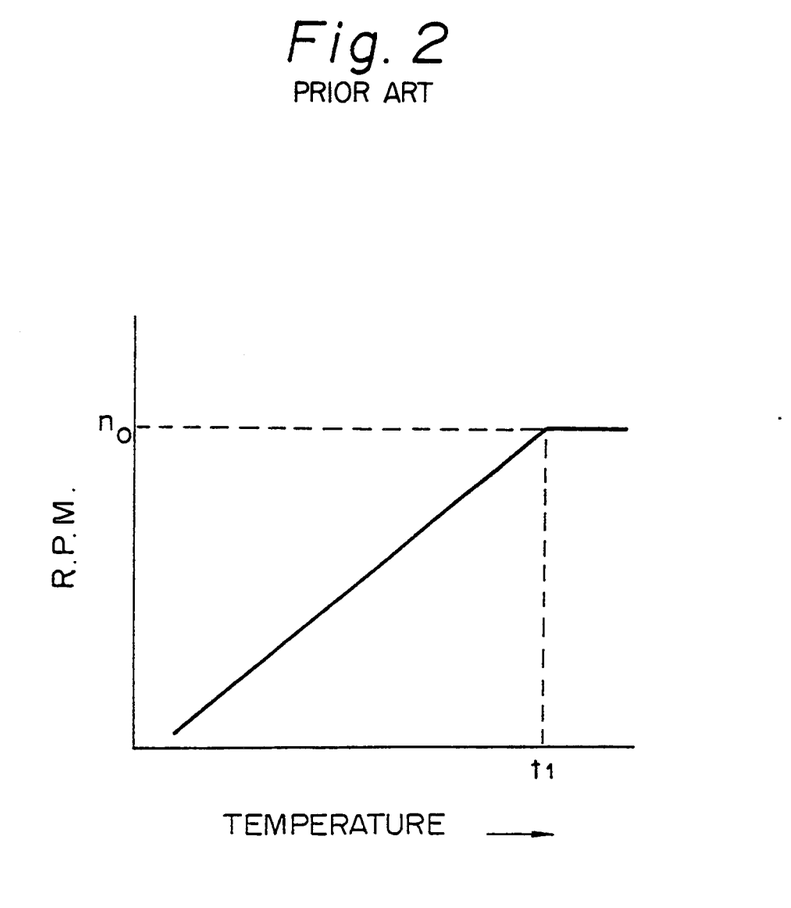
FIG. 2 is a characteristic curve of revolutional speed vs. temperature of an embodiment of the present invention.

FIG. 2 is a revolutional speed vs. temperature characteristic of an embodiment of the present invention for reducing the offensive feeling to the ear.

In FIG. 2, when the temperature is more than $t_1$, the D.C. fan is rotated at a high speed, and when the temperature is less than $t_1$, a high speed drive is carried out at a revolution speed $r_1$ and the D.C. fan changes the number of revolution linearly for less than a temperature $t_1$ to render the noise low and reduce the offensive sound slightly.

Figure 3A:
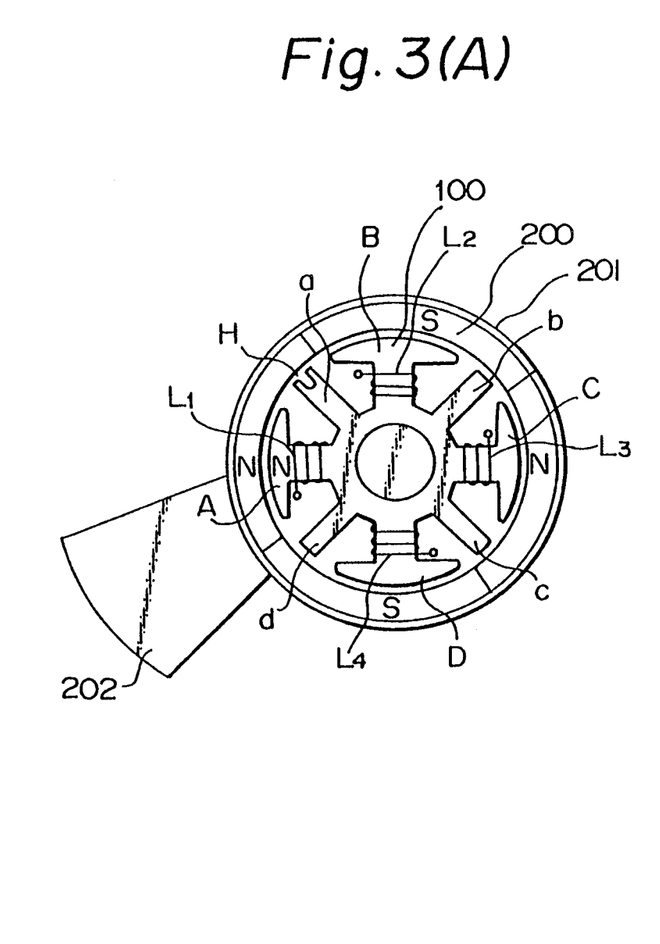
FIGS. 3(A) and 3(B) are schematic configuration diagrams showing a cooling D.C. fan of an embodiment of the present invention.
Figure 3B:
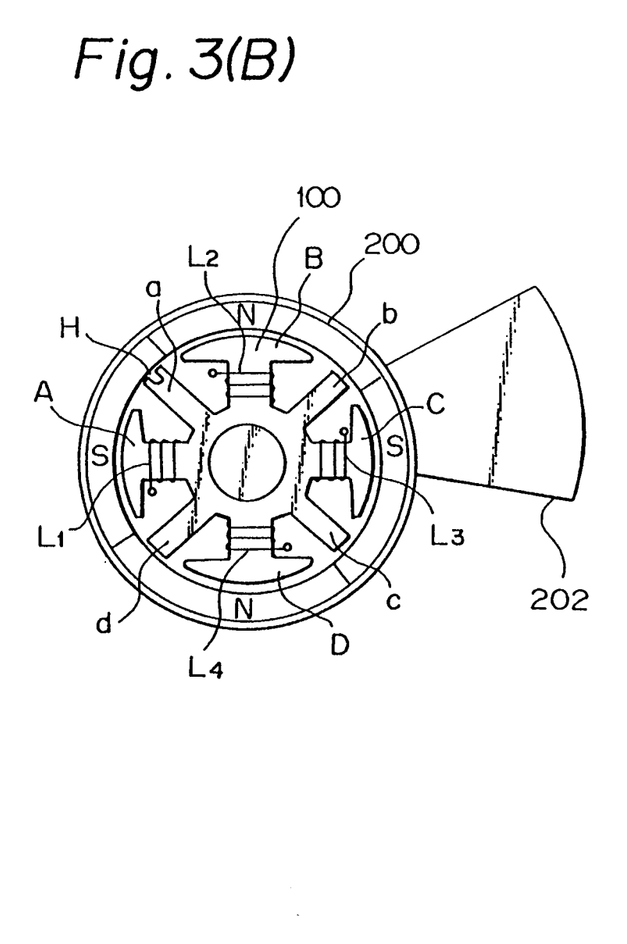

FIGS. 3(A) and 3(B) denote a schematic configuration diagram of a cooling D.C. fan. A stator 100 includes two pairs of main poles (A, C) and (B, D) and two pairs of auxiliary poles (a, c) and (b, d). Each coil L1, L2, L3 and L4 are wound on each main pole A, B, C, and D and a Hall effect element H is provided with the auxiliary pole a. A rotor 200 is formed by a casing 201, and at least two pairs of N and S poles and a plurality of blades (Only one blade is represented among them for brevity's sake).

Now, when a rotor 200 is situated at the position shown in FIG. 3A, a Hall effect element H detects an existence of N pole of a magnet to produce an output. The output signal is amplified by an amplifier in a driving IC 11 in FIG. 4A and turns on a switching transistor T1 in a driving IC 11 to flow current through a coil 5 (L1, L3). A pair of main poles A and C are magnetized to N poles, whereas the other pair of main poles B and D and auxiliary poles a to d are magnetized to S poles. Then, the S poles of auxiliary poles a and c attract the N poles of a rotor and the other poles repels thereto to produce a rotational torque.

Thus, the rotor rotates by 90 degrees and when the rotor is situated at a position in FIG. 3(B), a Hall effect element H detects S poles of the magnet and then, the switching transistor T2 in the driving IC 11 turns ON to flow current through a coil 6 (L2, L4). Thereby, the main poles B and D are magnetized to N poles, whereas the other main poles A and C and the auxiliary poles a to d are magnetized to S poles. The S poles of the auxiliary poles a and d attract the N pole of the rotor and repel the S pole, thus causing the rotor to rotate. These processes are repeated in sequence and the rotor is rotated continuously.

Figure 4A:
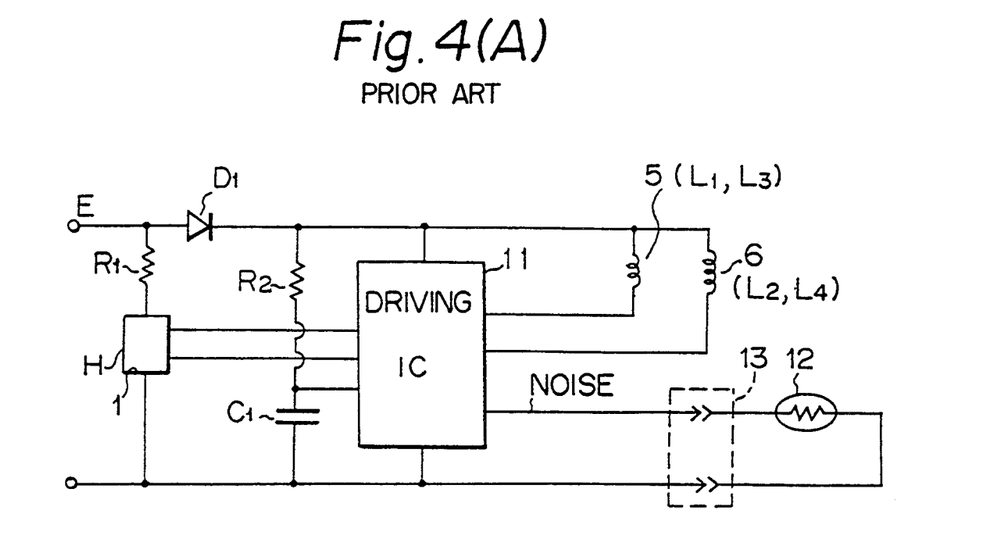
FIG. 4(A) is a schematic circuit diagram showing a D.C. fan control circuit of a first embodiment in accordance with the present invention.

FIG. 4(A) is a schematic circuit diagram showing an improved two-speed type D.C. fan of a first embodiment in accordance with the present invention.

In FIG. 4(A), a temperature sensor (S) 12, Hall effect elements (H) 1, coil 5 (including coils L1, L3, ...), coil 6 (including coils L2, L4, ...) are connected to a linear control driving IC 11. A driving IC includes an amplifier 2, switching transistors T1, T2. The temperature sensor 12 may be coupled to a connector 13. R1 and R2 denote resistors, C1 denotes a capacitor and D1 a diode.

Figure 4B:
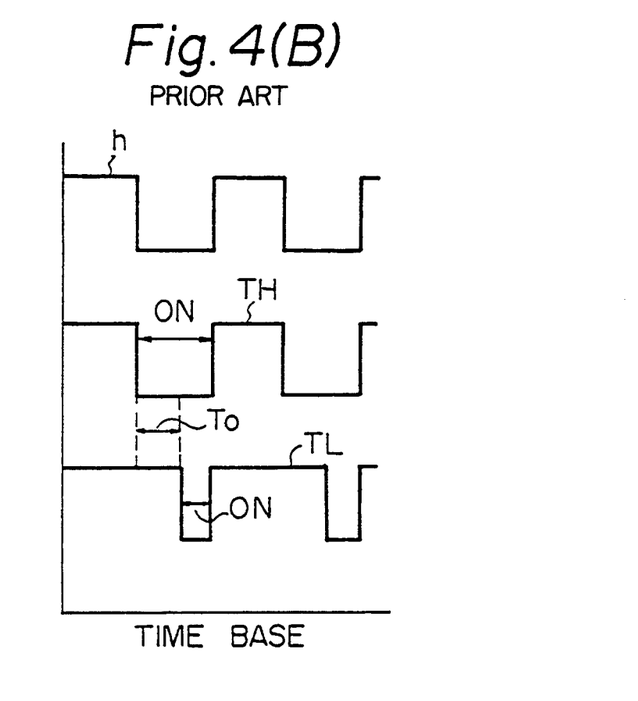
FIG. 4(B) is a waveform diagram showing an output signal of a Hall effect element and each output signal of switching transistors.
Figure 5A:
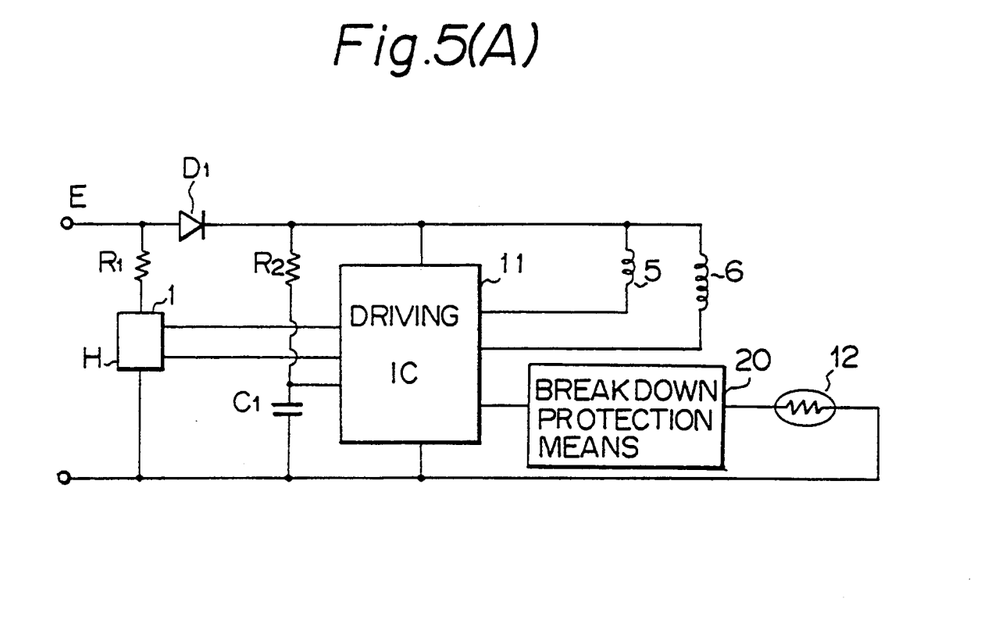
FIGS. 5(A) and 5(B) are schematic circuit diagrams showing a breakdown prevention unit and its application.
Figure 5B:
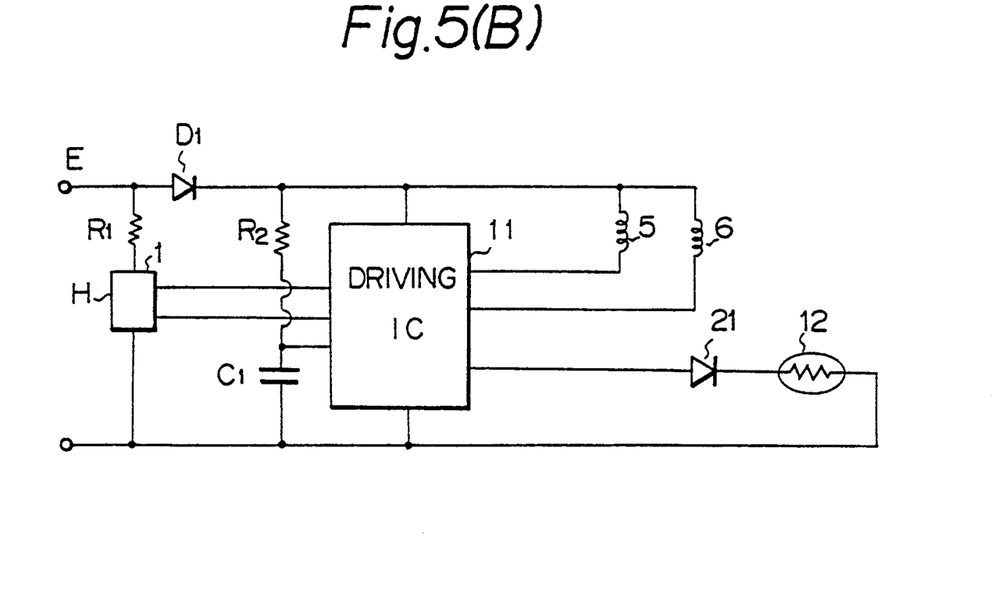

FIG. 4(B) is a waveform diagram showing an output signal of a Hall effect element and switching waveforms of switching transistors T1 and T2.

In the figure, h denotes an output of a Hall effect element H, TH a switching waveform of a switching transistor in the course of high speed revolution $n_0$ of the D.C. fan, and TL a switching waveform of a switching transistor in the course of a revolution speed less than $n_0$. $T_0$ denotes a difference of switching ON times of above transistors.

In the course of high speed revolution $n_0$, each switching transistor turns ON and OFF in synchronization with an output signal of a Hall effect element H and operates as same irrespective of a time constant of $C_1 \times R_2$. In the course of a revolution speed less than $n_0$, an ON time of the switching transistor is shortened by a time $T_O$ based on a time constant of $R_2 \times C_1$, a signal output from the temperature sensor S and a signal output from a Hall effect element H. Then, the ON time is controlled by a signal from the temperature sensor S to make the revolution speed change linearly.

When a driving voltage for the D.C. fan is accidentally applied to a lead to which the temperature sensor S is connected in the prior art linear speed control cooling system for the D.C. fan, there is a problem that a driving IC is damaged and the D.C. fan cannot be rotated.

In order to solve the problem, a breakdown protection unit 20 is provided between the driving IC 11 and the temperature sensor 12 in a first embodiment of the present invention. In practice a diode having a withstand voltage larger than the driving voltage E.

Accordingly, in the course of an assembly or a testing process, even if a driving voltage is accidentally applied to a lead to which the temperature sensor S is connected by a workman, it is easily assured to prevent a deterioration of the driving IC 11.

Further, in the prior art, the temperature within the computer equipment or the environment is detected by a temperature sensor to determine a revolution speed that matches to the detected temperature. If a breaking of wire in the temperature sensor unit or a disconnection occurs, the torque becomes remarkably small and the fan stops rotating or the revolution speed reduces remarkably. Therefore, it is disadvantageous that the internal temperature of the computer equipment increases to prevent a normal operation of the computer equipment and a damage of a semiconductor element such as the driving IC 11 leads to a system failure.

Figure 6A:
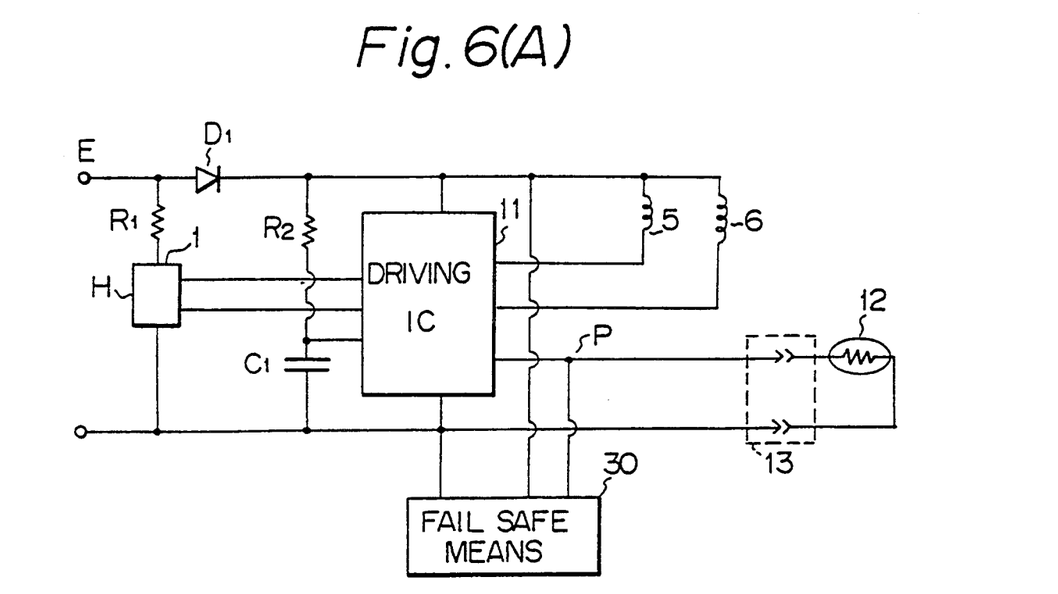
FIGS. 6(A) and 6(B) are schematic circuit diagrams showing a fail safe means and its application.

A second embodiment of the present invention will be described in FIG. 6(A). FIG. 6(A) is a schematic circuit diagram showing a second embodiment. Reference numeral 30 denotes a fail safe circuit which is used to reduce the potential of a point P in the case of a disconnection or a breaking of wire in the temperature sensor unit 12.

If the potential of a point P is high, the driving IC 11 is controlled such that a flowing time of current through a coil L1 or L2 is shortened to reduce the revolutional speed of the D.C. fan, whereas if the potential of a point P is low, the revolutional speed is increased.

Therefore, a prior art drawback that, in the case of a disconnection or a breaking of wire in the temperature sensor unit 12, the potential of a point P becomes the highest and the revolutional speed of the D.C. fan is reduced, is solved in the present invention. Since the potential of a point P is reduced in such case, the revolutional speed of the fan is not reduced, but can be increased.

In accordance with the present invention, the fail safe circuit 30 monitors the potential of a point P and is functioned to reduce the potential of a point P in the case of a disconnection or a breaking of wire, so that the D.C. fan can rotate very fast in such case.

Figure 6B:
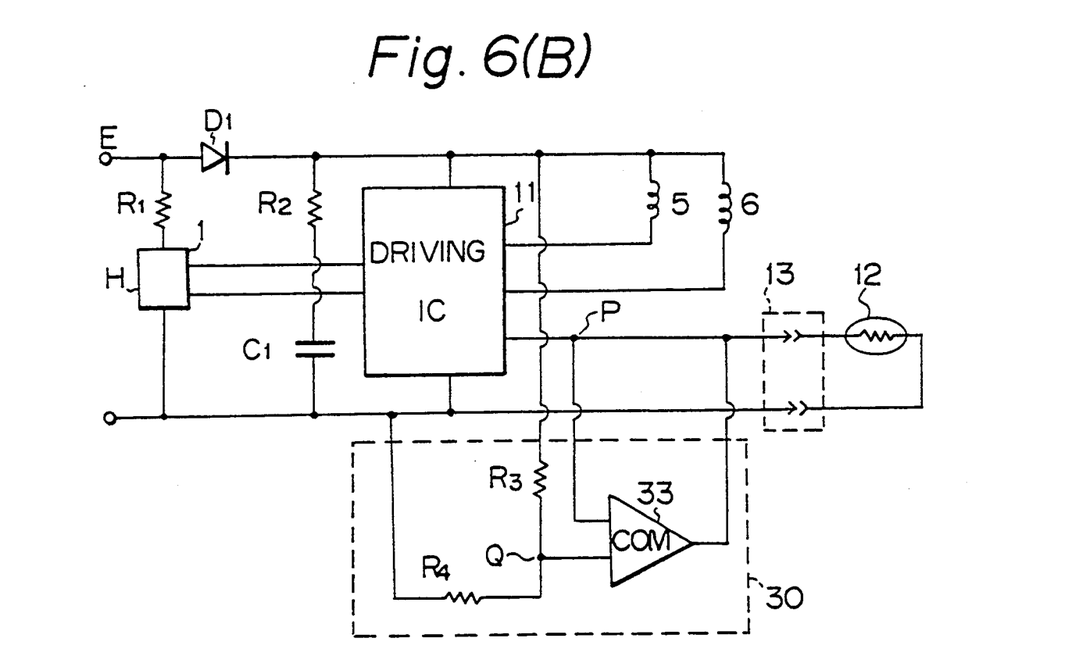

FIG. 6(B) shows an example of a fail safe circuit including a comparator and resistors $R_3$, $R_4$. The comparator 33 compares the potential of a point P with that of a point Q and if the potential of P is higher than that of Q, the comparator 33 operates to output a nearly 0 V and the potential of a point P is reduced.

Accordingly, resistors $R_3$ and $R_4$ are selected such that a voltage of a point Q is more or less lower than that of a point P in the case of a disconnection or a breaking of wire. Thereby, if a disconnection or a breaking of wire takes place, a comparator 33 is activated and makes the potential of a point P nearly equal to zero volt. Therefore, the D.C. fan rotates very fast and does not reduce a cooling capability.

Next, in the prior art, since a connection from a D.C. fan to a temperature sensor is made within the computer equipment, an electrical noise produced within the computer equipment exerts influence on the wiring, and the D.C. fan produces an abnormal rotation to lead to a low speed rotation or stop rotating. Therefore, it is also disadvantageous that the internal temperature within the computer equipment is increased, the computer equipment cannot be operated ordinarily and a system failure occurs.

A third embodiment of the present invention will be described in FIGS. 7(A), 7(B) and 7(C).

Figure 7A:
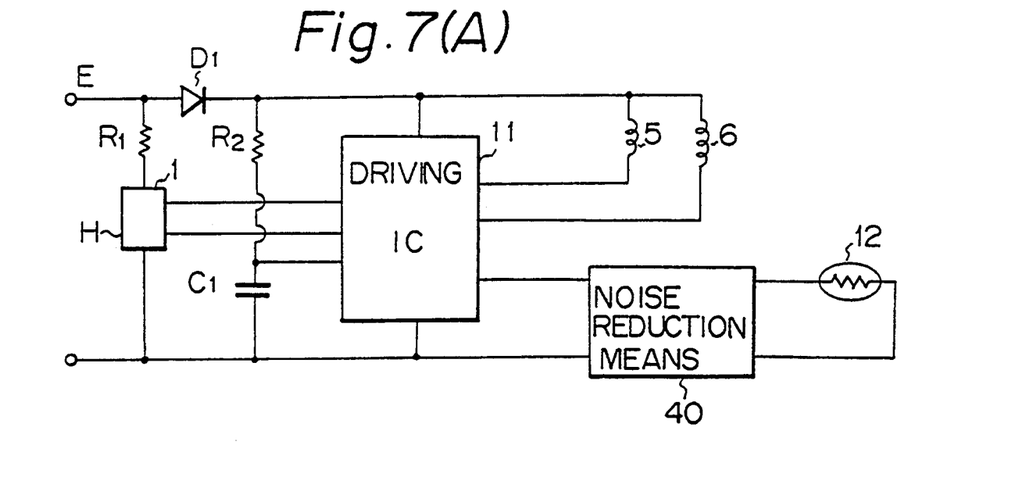
FIGS. 7(A), 7(B) and 7(C) are schematic circuit diagrams showing noise reduction means and its application.

FIG. 7(A) is a schematic diagram showing a noise reduction means 40 of a third embodiment. Reference numeral 41 in FIG. 7(B) denotes a filter.

As described above, when a noise is applied in the wiring between a temperature sensor and a driving IC, the D.C. fan often stops rotating or could rotate abnormally at a low speed. If a noise reduction means is provided, even if such noise is applied to the above-noted wiring, the noise can be eliminated before it is input to the driving IC 11, so an abnormal state of the D.C. fan can be prevented.

Figure 7B:
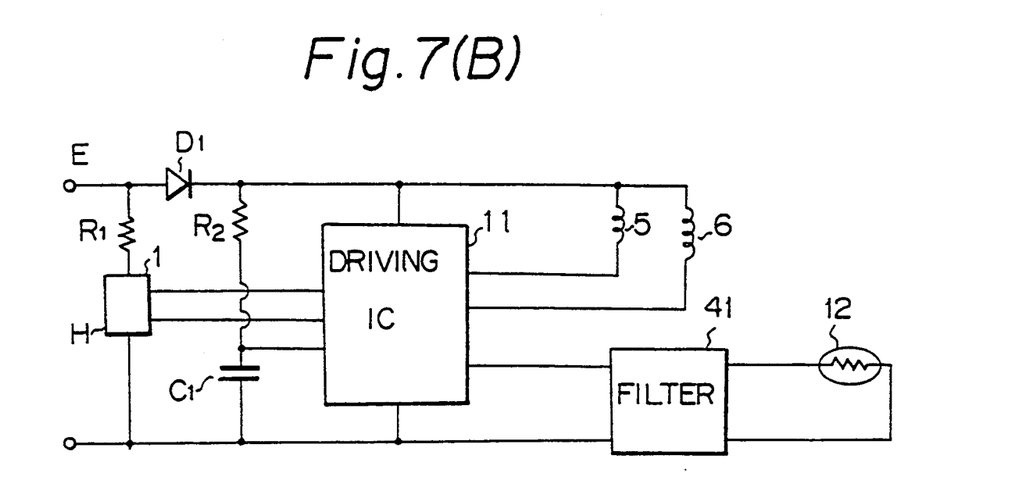

An example that a filter 41 is used as a noise reduction circuit 40 is illustrated in FIG. 7(B). In general, since a wiring to a temperature sensor 12 is provided in the equipment, it is easily to be affected very much by an electrical noise. According to the third embodiment, since an electrical noise produced in the internal portion of the computer equipment is absorbed by a filter 41 not to be input to the driving IC, it does not occur that the D.C. fan stops rotating or it rotates abnormally at a low speed.

Figure 7C:
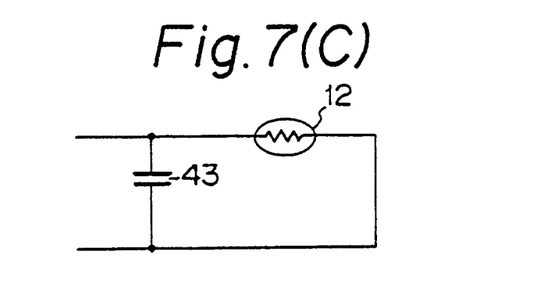

FIG. 7(C) is a view showing an example where a capacitor 43 is used as a filter. The example is, of course, not limited to only a capacitor. It is preferable that more than a capacity of 1 $\mu$F may be used and the capacitor may be provided in the neighborhood of a driving IC and connected to the side of the D.C. fan.

Still further, the linearly variable speed cooling D.C. fan in the prior art detects an internal or environmental temperature in the computer equipment at a temperature sensor unit to determine the revolutional speed in conformity with the temperature. Therefore, if the temperature is low, the revolutional speed is reduced accordingly. When the temperature is low, a starting torque becomes small, so that the D.C. fan stops rotating or becomes unable to start and the computer equipment is in a state of natural air cooling.

Since the computer equipment is originally designed to use a forced air cooling system by means of a fan, when the fan stops rotating to be in a state of natural air-cooling, a specified portion in the computer equipment is heated extraordinary. There are drawbacks for which the computer equipment cannot be operated normally and a system failure occurs.

As described above, the environmental temperature such as within the computer equipment or the room temperature is detected by a temperature sensor and the rotation of the D.C. fan is controlled so as to meet the environmental temperature. If the temperature is low, the revolutional speed follows up accordingly to be reduced, the starting torque becomes small and the D.C. fan often stops rotating and the starting operation is impossible.

Figure 8A:
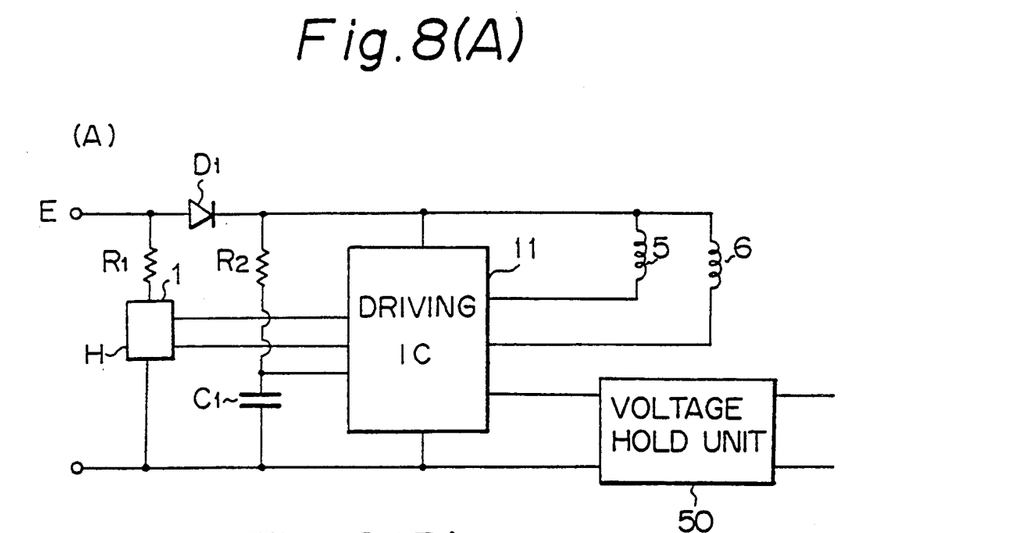
FIGS. 8(A) and 8(B) are schematic circuit diagrams showing a voltage hold unit and its application.

To solve the above drawback, a fourth embodiment is devised. In this embodiment, when the temperature is low and the voltage of the temperature sensor on the driving IC side rises, since the voltage is controlled to a definite voltage by a voltage hold unit 50 in FIG. 8(A), the revolutional speed of the D.C. fan is kept constant.

Figure 9:
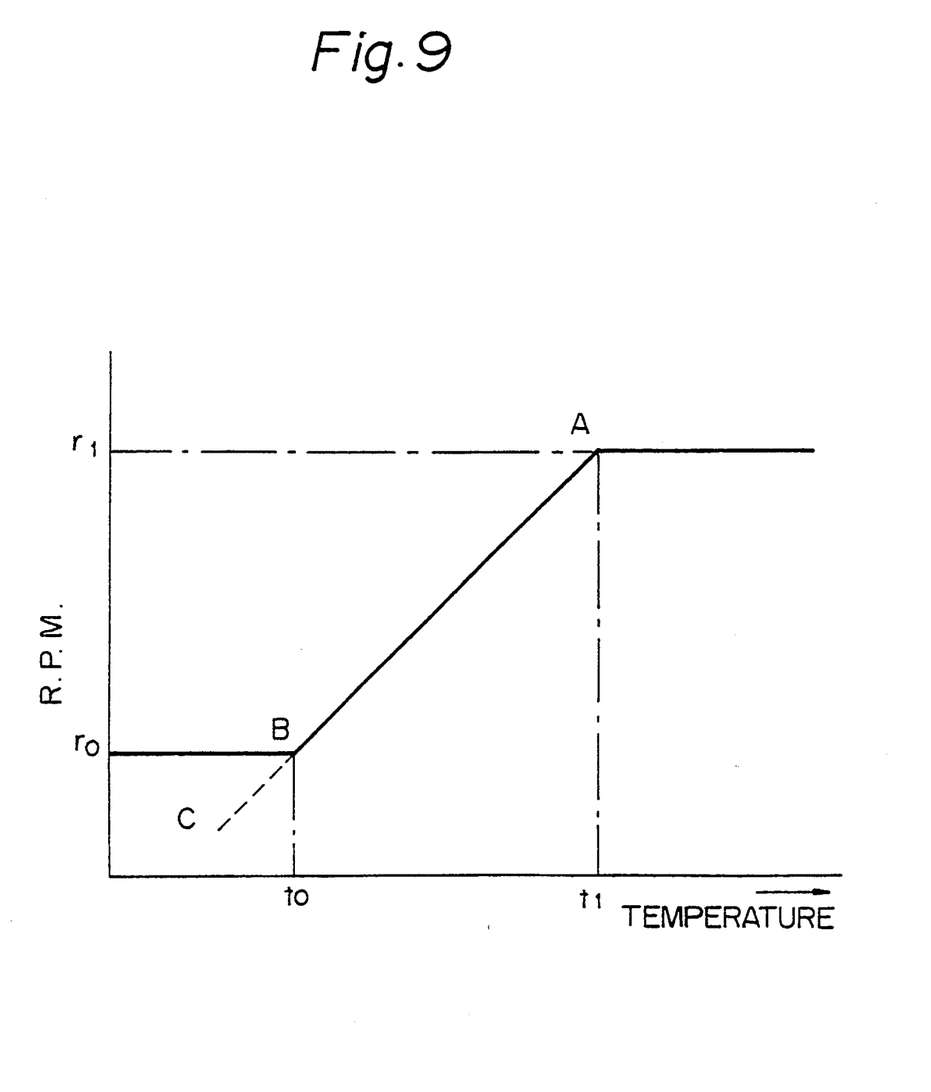
FIG. 9 is a characteristic diagram of revolutional speed vs. temperature in a fourth embodiment of the present invention.

As shown in FIG. 9, even if the temperature falls down to less than $t_0$, since the revolutional speed of the D.C. fan is kept on a definite value $r_0$. Therefore, as shown in a broken line BC, based on the reduction of the revolutional speed, an abnormal state that the D.C. fan stops rotating, an abnormal rotation occurs at a low speed and an activation thereof is impossible can be prevented.

Figure 8B:
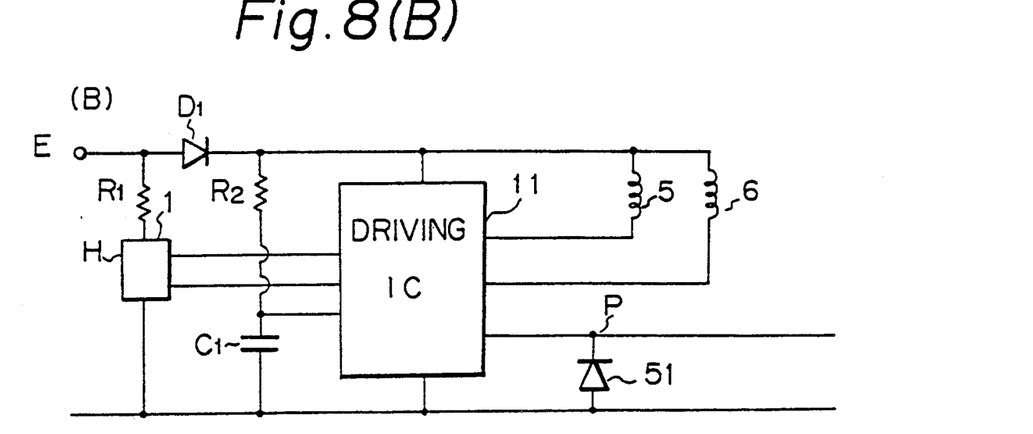

FIG. 8(B) is a schematic diagram showing the D.C. fan including a voltage hold unit 50 having a zener diode 51. Even if the temperature is lowered and a voltage at a point P is high, the voltage at a point P does not become higher than a zener voltage due to a zener diode 51. Therefore, even if the temperature is lower than $t_0$, the voltage at a point P is kept at a zener voltage and the revolutional speed of the D.C. fan is kept at a constant value $r_0$.

In accordance with the present invention, even if the temperature lowers, since the D.C. fan can keep the revolutional speed constant in less than a predetermined low temperature, it can prevent an abnormal heating in the computer equipment.

We claim:

1. A linearly variable speed cooling D.C. fan comprising:
   a stator including at least two pairs of main poles, two pairs of auxiliary poles and a Hall effect element provided on at least one of the auxiliary poles;
   a rotor including a casing, at least two pairs of N and S poles and a plurality of blades;

a driving IC including an amplifier and two switching transistors;

a temperature sensor detachable to a connector means, for determining a revolution speed of the D.C. fan based on the detected temperature; and a breakdown protection unit connected between said driving IC and said temperature sensor, including at least one of a resistor and a diode having a withstand voltage larger than a driving voltage of the fan.

2. A linearly variable speed cooling D.C. fan according to claim 1, further comprising:

fail safe means connected between said driving IC and said temperature sensor, for increasing a revolutional speed of the D.C. fan in an occurrence of one of a disconnection of a connector to which the temperature sensor is coupled and a breaking of wire in the temperature sensor, regardless of whether an input terminal voltage changes.

3. A linearly variable speed cooling D.C. fan according to claim 2, wherein said fail safe means includes a comparator and resistors.

4. A linearly variable speed cooling D.C. fan according to claim 1, wherein noise reduction means is included in a temperature sensor input circuit of said D.C. fan driving I.C.

5. A linearly variable speed cooling D.C. fan according to claim 4, wherein said noise reduction means includes a filter.

6. A linearly variable speed cooling D.C. fan according to claim 4, wherein said noise reduction means includes a capacitor.

7. A linearly variable speed cooling D.C. fan according to claim 1, wherein voltage hold means is included in a temperature sensor input circuit of said D.C. fan driving I.C.

8. A linearly variable speed cooling D.C. fan according to claim 7, wherein said voltage hold means is formed by a zener diode.

9. An apparatus comprising:

a direct current (dc) motor having a rotor;

a fan attached to the rotor;

a driving integrated circuit (IC) coupled to the dc motor and having a sensor input, controlling a rotation speed of the fan based on a signal indicative of a detected temperature received at the sensor input;

a temperature sensor coupled to the sensor input of the driving IC, generating the signal indicative of the detected temperature; and a breakdown protection circuit including a diode coupled between the sensor input of the driving IC and the temperature sensor, preventing current from damaging the driving IC.

10. An apparatus as claimed in claim 9, wherein the apparatus generates a predetermined voltage, further comprising:

a failsafe circuit including a comparator having a first input and an output coupled to a conductive line between the sensor input of the driving IC and the temperature sensor, and a second input receiving the predetermined voltage, reducing a voltage level at the conductive line based on one of a disconnection of the temperature sensor and a failure of the temperature sensor, so that the driver IC controls the dc motor to rotate the fan at a predetermined speed.

11. An apparatus as claimed in claim 9, further comprising:

a noise reduction circuit including a capacitor coupled across the sensor input of the driving IC.

12. An apparatus as claimed in claim 9, further comprising:

a voltage hold unit coupled across the sensor input of the driving IC.

13. An apparatus comprising:

a direct current (dc) motor having a rotor;

a fan attached to the rotor;

a driving integrated circuit (IC) coupled to the dc motor and having a sensor input, controlling a rotation speed of the fan based on a signal indicative of a detected temperature received at the sensor input;

a temperature sensor coupled to the sensor input of the driving IC, generating the signal indicative of the detected temperature; and a breakdown protection circuit including a resistor coupled between the sensor input of the driving IC and the temperature sensor, preventing current from damaging the driving IC.

* * * * *

UNITED STATES PATENT AND TRADEMARK OFFICE
CERTIFICATE OF CORRECTION

PATENT NO. : 5,363,024
DATED : November 8, 1994
INVENTOR(S) : Yoshiaki HIRATSUKA et al.

It is certified that error appears in the above-indentified patent and that said Letters Patent is hereby corrected as shown below:

Col. 2, line 7, delete ":".

Col. 8, line 20, change "driver" to --driving--.

Signed and Sealed this

Tenth Day of January, 1995

Attest:

BRUCE LEHMAN

Attesting Officer

Commissioner of Patents and Trademarks